United States Patent [19]

Gerber, Jr.

[11] 4,329,541

[45] May 11, 1982

[54] DIALING SYSTEM FOR TELEPRINTER

[76] Inventor: Robert F. Gerber, Jr., Box 4E, Star Rte., Jim Thorpe, Pa. 18229

[21] Appl. No.: 150,675

[22] Filed: May 14, 1980

[51] Int. Cl.³ .................... H04M 1/42; H04L 15/00
[52] U.S. Cl. ................................ 178/3; 178/2 R; 178/17 C; 179/90 K
[58] Field of Search ........... 179/90 B, 90 BB, 90 BD, 179/90 K, 90 R, 2 DP, 18 B, 18 FA; 178/2 R, 3, 74, 75, 76, 17 R, 17 C

[56] References Cited

U.S. PATENT DOCUMENTS

| | | | |
|---|---|---|---|
| 3,733,440 | 5/1973 | Sipes | 179/18 B |
| 3,856,982 | 12/1974 | Lawson et al. | 179/90 K |
| 3,885,108 | 5/1975 | Zock | 179/90 B |
| 3,956,596 | 5/1976 | Connolly et al. | 179/90 K |
| 4,000,363 | 12/1976 | Widmaier | 178/2 R |
| 4,008,380 | 2/1977 | La Borde | 179/90 K |
| 4,012,601 | 3/1977 | Kehren | 179/90 K |
| 4,119,810 | 10/1978 | Marin et al. | 179/90 K |
| 4,143,243 | 3/1979 | Sutton | 179/90 B |
| 4,232,200 | 11/1980 | Hestad et al. | 179/90 K |

Primary Examiner—Thomas A. Robinson
Attorney, Agent, or Firm—Harvey B. Jacobson

[57] ABSTRACT

A dialing system which utilizes a keypad on teleprinters retrofitted into existing teleprinter models through interfacing by voltage biasing and output circuitry with integrated circuit components having inputs to the teleprinter keypad and a pulse driver coupled to the existing dialing circuit through relays. The relays, driver and integrated circuit components are energized under different voltage levels lower than the teleprinter operating voltage through the voltage biasing circuits connected to the teleprinter power supply.

15 Claims, 3 Drawing Figures

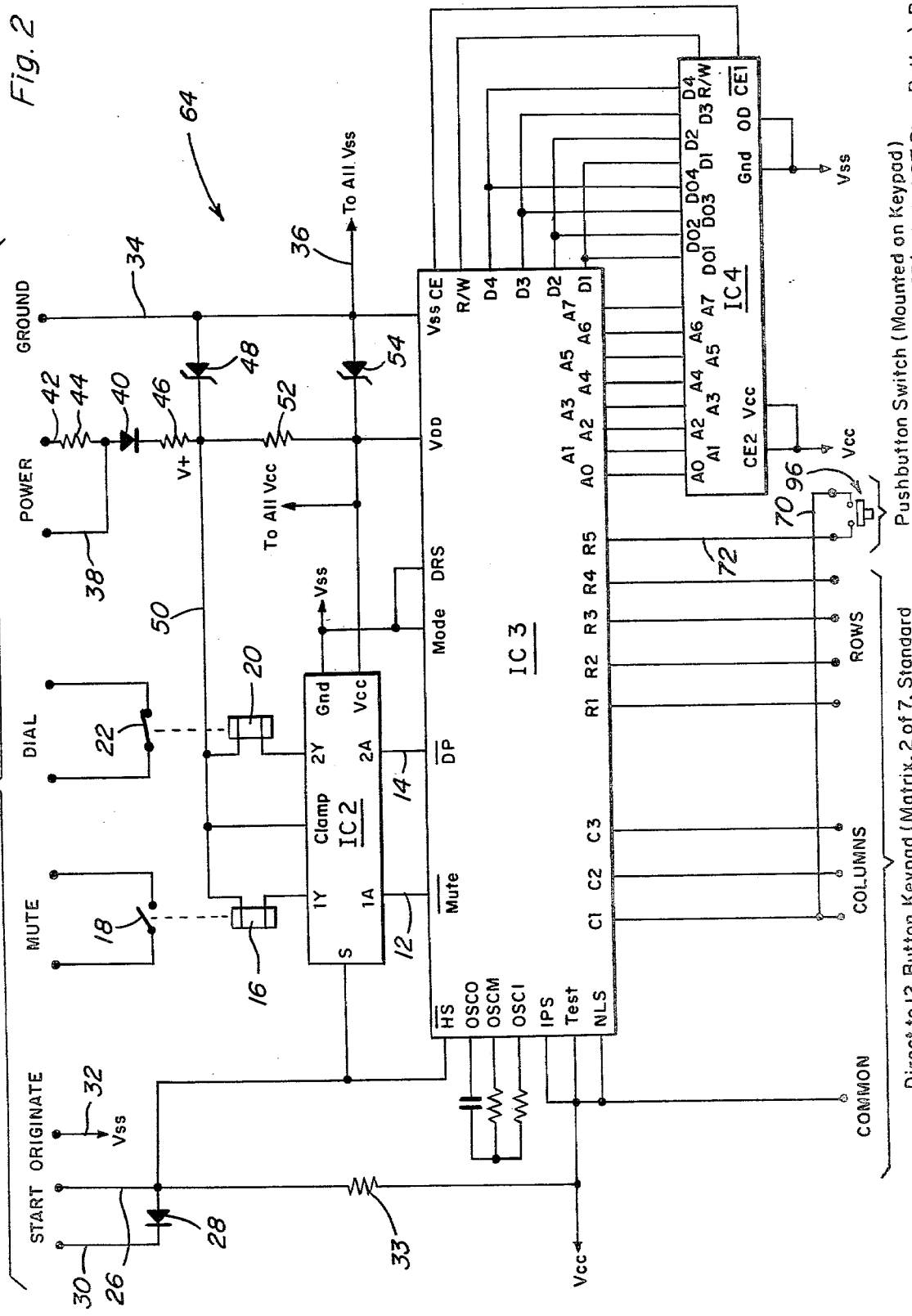

DIALING SYSTEM FOR TELEPRINTER

BACKGROUND OF THE INVENTION

1. Field of the Invention

This invention relates to circuit arrangements and teleprinter apparatus and specifically to a device which can be retrofitted into an existing teleprinter to automatically output dialing pulses in response to a stored multi-digit number.

2. Discussion of Related Art

Many existing teleprinter models are presently in use. These include the M-28 TELEX, M32 TELEX, M33 TWX or M35 TWX and variations of these models. As presently used, these teleprinters are equipped with a rotary dial mechanism which operates a relay causing the outputting of selection pulses which are conducted via a teleprinter line to an exchange system. Use of a rotary dial as described contains many disadvantages. A dial is mechanical and therefore subject to wear. Further each time a number is to be called, each digit of the number must be sequentially inputted manually into the system through use of the dialer.

Various dialing systems for telephones and teleprinters have been suggested. For instance, U.S. Pat. No. 4,000,363, issued Dec. 28, 1976, to Widmaier, shows a teleprinting apparatus which utilizes the keyboard through a coding system to generate pulse trains thereby eliminating the dial switch. A selection pulse generator is supplied with signals from a counter pulse train of constant repetition frequency, the number being determined by the selection of the key on the keyboard. The Widmaier system utilizes digital circuitry; however, no specific provision is disclosed for establishing the appropriate voltage levels for the integrated circuitry. U.S. Pat. No. 3,733,440, issued May 15, 1973, to Sipes, discloses a semiautomatic call placement system wherein wake up messages are delivered automatically to a plurality of telephone numbers which are stored in a memory and dialed automatically at a predetermined time. U.S. Pat. No. 4,143,243, issued Mar. 6, 1979, to Sutton, shows a telephone set which will automatically redial a telephone number after a busy signal has been received and continues redialing that number until the party being called answers, or until a predetermined number of attempts have been made. U.S. Pat. No. 3,956,596, issued May 11, 1976, to Connolly et al., shows a pushbutton telephone semiconductor dialing circuit power supply comprising a capacitor fed by a diode bridge placed in series with the line looping circuit during dialing. The capacitor size is chosen to charge to at least minimum circuit supply voltage during make periods of line looping, and to keep the circuit supplied during break periods. U.S. Pat. No. 3,856,982, issued Dec. 24, 1974, to Lawson et al., discloses a pushbutton unit to replace the dial of a telephone instrument. The pushbutton operation enters dialed digits into an MOS circuit whose outputs operate relays. One of the relays repeats the digits to the line in conventional impulse train form, while the other deals with "off normal" dial functions. The electronics is line powered.

SUMMARY OF THE INVENTION

One object of the present invention is to provide a dialing system which can be incorporated into existing teleprinters to replace the existing mechanical rotary dial.

A further object of the present invention is to provide a dialing system for teleprinters wherein the existing teleprinter power supply is used for biasing the circuit components of the dialing system.

An even still further object of the present invention is to provide a dialing system for teleprinters which can be directly and easily connected to a variety of teleprinter models.

In accordance with the above objects, the dialing system of the present invention includes power and ground lines taken from the power supply of the existing teleprinter terminal. Appropriate voltage levels are produced by the use of voltage regulators in the form of zener diodes and current limiting resistors connected between the power line and the ground line. The highest voltage level is supplied to a pair of relays, one of which controls the dial function and the other of which controls the mute or off normal function of the teleprinter. A second voltage level is established to appropriately bias a dual peripheral driver connected to the dial and off normal relays of the system. Inputs to the dual peripheral driver are taken from a dialing circuit in integrated circuit form. In one embodiment, this integrated circuit comprises a repertory dialer connected to a random access memory (RAM) capable of storing a plurality of 16 digit numbers. The repertory dialer can directly interface with a 12 button keypad of the teleprinter which is used to input information to the dialer to the RAM. An additional input is connected to the repertory dialer from the start or originate button of the teleprinter for commanding operation of the dialing system. An additional pushbutton switch is mounted on the keypad or basal plate of the teleprinter for commanding storage of an inputted number.

A second embodiment of the invention utilizes a pulse dialer which temporarily stores a single number to be outputted from the system. The pulse dialer is connected through a dual peripheral driver to a dial and off normal or mute relay and has inputs directly interfaced to a 12 button keypad of the teleprinter. A third reference voltage level must be established by the use of an additional current limiting resistor and zener diode for the pulse dialer.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a schematic representation of the invention using a repertory dialer and random access memory.

DISCUSSION OF THE PREFERRED EMBODIMENTS

Figure 1:
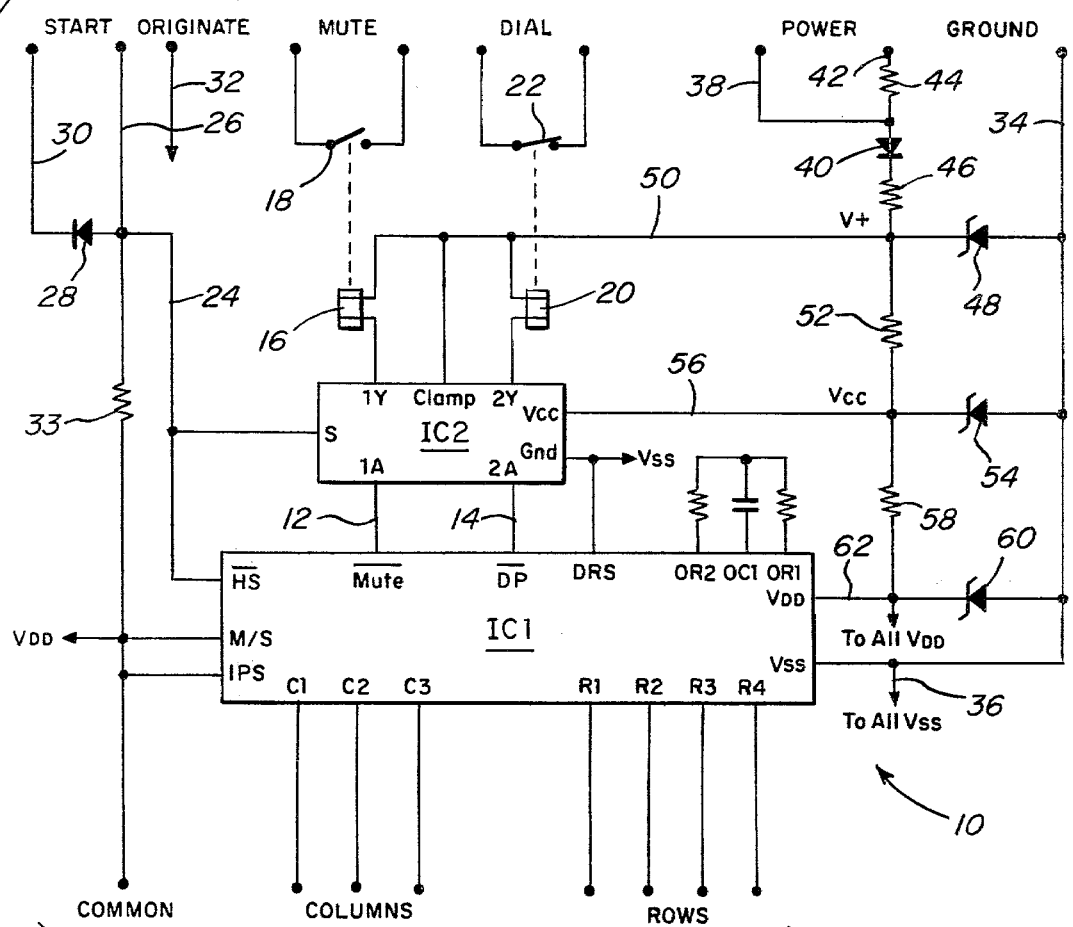
FIG. 1 is a schematic illustration of the dialing system of the present invention using a pulse dialer.

Now with reference to the drawings, a dialing system for teleprinters incorporating the principles and concepts of the present invention will be described in detail. With particular reference to FIG. 1, the circuitry for an automatic recall dialing system generally referred to by the reference numeral 10 will be described in detail. The system includes an S2560A pulse dialer which is a CMOS integrated circuit for converting pushbutton inputs to a series of pulses suitable for telephone dialing and is manufactured by American Microsystems, Inc., and referred to in the drawings by the reference characters IC1. IC1 interfaces to a 12 button keypad or matrix, 2 of 7, or a standard keypad code configured in a standard 3X4 double contact keypad with common by connection of the column inputs C1, C2, C3, the row inputs R1, R2, R3, R4 and the common input of IC1 directly to the existing keypad. The common lead from the keypad is also connected to the interdigit pause select input (IPS) of IC1, mark space ratio input (M/S) of IC1 and the voltage level $V_{DD}$ established by the circuit biasing network to be discussed hereinafter.

The outputs of IC1 comprise the $\overline{mute}$ and $\overline{DP}$ outputs which are inputted through lines 12 and 14 to inputs 1A and 2A of IC2 which is a Texas Instruments Series 75418 dual peripheral driver. The $\overline{mute}$ output emits a pulse which acts through IC2 to perform the muting or off normal function of the teleprinter through mute relay 16 and normally open contacts 18. The $\overline{DP}$ output emits dialing pulses which actuate the dial relay 20 and normally closed contacts 22 on the dialing lines of the teleprinter.

The S input on IC2 and the $\overline{HS}$ input on IC1 are connected through line 24 and through line 26 to the originate key on a TWX terminal or through line 24, diode 28 and line 30 to the start key on a TELEX terminal. Both the start or originate keys provide normally closed contacts to line 32 which presents a $V_{SS}$ or low input signal to IC1 and IC2. Line 24 is also connected through pull up resistor 33 to the $V_{DD}$ voltage level. Accordingly, by depression of the start or originate keys on the TELEX and TWX terminals, respectively, a momentary high voltage signal is passed to the S input of IC2 and the $\overline{HS}$ input of IC1.

A ground line 34 is connected to ground on TELEX and TWX terminals and connected through line 36 to all $V_{SS}$ marked lines. The various biasing potentials $V+$, $V_{CC}$, $V_{DD}$ and $V_{SS}$ which represent 12 volts, 4.7 volts, 3.3 volts and the ground, respectively, are generated by appropriate biasing and regulation of the voltages generated in the teleprinter itself. Line 38 is connected directly to the 20 volt power supply of a TELEX terminal and passed to the anode of negative voltage isolation diode 40. If a TWX terminal is used, line 42 is connected to the 16 volt power supply thereof and passed through current limiting resistor 44 to the anode of diode 40. The cathode of diode 40 is connected to one side of current limiting resistor 46 with the voltage on the opposite side of resistor 46 being regulated by zener diode 48 connected between the resistor and ground line 34. The node between the zener diode 48 and the resistor 46 supplies the $V+$ voltage of 12 volts which is passed through line 50 to the positive terminals of relays 16 and 20. It should be noted that line 38 is connected to a 20 volt source while line 42 is connected to a 16 volt source thus making the circuit amenable for use with any 20 volt or 16 volt terminal. Obviously, a 12 volt terminal could be directly connected to line 50 to supply 12 volt $V+$. Current limiting resistor 52 is connected between line 50 and a second zener diode 54. Zener diode 54 regulates the voltage to line 56 at 4.7 volts which is the $V_{CC}$ supply level. This voltage is inputted to IC2 at the $V_{CC}$ pin. Current limiting resistor 58 is connected between line 56 and zener diode 60 which regulates the voltage to line 62 at 3.3 volts which is the $V_{DD}$ level inputted to the $V_{DD}$ pin of IC1 and all other lines marked $V_{DD}$.

To dial a number, the user depresses the start or originate key which presents a momentary $V_{DD}$ signal to the $\overline{HS}$ input of IC1. This momentary signal insures that all latches within IC1 come up in a known state to insure proper operation. The $V_{DD}$ signal is also applied to the S input of IC2 which acts as an inhibit to the transmission of mute or dial signals on lines 12 and 14 when a high signal is present on line 24. IC2 comprises two NOR gates each of which has one input connected to the S pin of IC2. The other input of one of the NOR gates is connected to pin 1A while the other input of the second NOR gate is connected to pin 2A. Each NOR gate drives a separate NPN transistor the collectors of which are connected to output pins 1Y and 2Y respectively. The clamp pin of IC2 provides a clamping diode across each of the coils 16 and 20. A high input on line 24 holds the collectors of the transistors high and thus maintains the relays 16 and 20 in an "off" state. When the signal on line 24 goes low, pulses from lines 12 and 14 can be transmitted to the relays 16 and 20. After the start or originate button is released, the user enters the desired numbers to be dialed through the keyboard. Dial pulsing starts as soon as the first digit is entered and the number entered is retained in the memory of IC1 for future redial. Pauses may be entered when required in the dial sequence by depressing the "#" key which provides access pauses for future redial. Any number of access pauses may be entered as long as the total entries do not exceed 20. The numbers to be dialed are outputted on the $\overline{DP}$ pin of IC1 through line 14 and buffered in IC2 prior to actuating relay 20 and contacts 22 in the dial line of the teleprinter. At the same time, a $\overline{mute}$ output is produced on line 12, buffered and utilized to actuate relay 16 to produce the mute or off normal function of the teleprinter.

The last number dialed is retained in the memory of IC1 and therefore can be redialed by depressing the start or originate key of the teleprinter and then depressing the "#" key. Dial pulsing will start when the key is depressed and finish after the entire number is dialed out unless an access pause is detected. In such a case, the dial pulsing will stop and will resume again only after the user pushes the "#" key.

As long as power is supplied to the teleprinter, the biasing network comprising resistors 44, 46, 52, 58 and zener diodes 48, 54 and 60 will be operative to maintain the circuitry of the invention in operation. No external power supply is required and all of the connections of circuit 10 can interface directly and internally with a large number of teleprinters. This interface can be achieved with cables or PC board mounted miniature connectors to the terminal with ease and simplicity.

Now with reference to FIG. 2, a programmable automatic dialer referred to by the reference numeral 64 will be described in detail. The circuit 64 includes IC3 with an S2562 repertory dialer. IC3 is an integrated circuit that can perform storing or retrieving, normal dialing, redialing or auto dialing of one of one of several desired numbers and is manufactured and sold by American Microsystems, Inc. IC3 is intended to be used with American Microsystems, Inc. standard S5101-256X4 RAM that functions as a number storage unit and is labelled with the reference characters IC4.

IC3 is connected to the 12 button keypad of the teleprinter in the same manner as IC1 through the use of pin C1, C2, C3, R1, R2, R3 and R4 which are connected to the columns and rows of the keypad. In addition, a pushbutton normally open switch is connected between lines 70 and 72 which extend from pins C1 and R5 respectively. This additional switch can be mounted on the keypad of the teleprinter and is used during the store procedure of the circuit.

The $\overline{\text{mute}}$ and $\overline{\text{DP}}$ outputs of IC3 are connected through lines 12 and 14 to IC2 which is a Texas Instruments Series 75416 dual peripheral driver. IC2 drives relays 16 and 20 which are the mute and dial relays respectively containing contacts 18 and 22. Outputting of signals from the $\overline{\text{mute}}$ and $\overline{\text{DP}}$ outputs of IC3 is similar in function to that described with respect to IC1.

The biasing voltage levels are achieved through the use of resistors 44, 46, 52 and zener diodes 48 and 54 which establish the V+ and $V_{CC}$ voltage levels of 12 and 4.7 volts respectively. Line 34 is connected to the teleprinter ground. Lines 38 and 44 are connected to the 16 or 20 volt teleprinter power supplies respectively with diode 40 providing negative voltage isolation for the biasing network. It will be noted that it is possible to operate circuit 64 with only two voltage levels and the ground rather than 3 voltage levels needed for circuit 10 of FIG. 1.

IC3 is capable of receiving sequential inputs from the keypad and storing the number received (16 digit maximum). Once the number is retained, the complete number can be moved from IC3 to IC4. This is accomplished by depressing the store button 96 connected to lines 70 and 72 followed by depression of any of the 12 keypad buttons 1 through 0, *, #, which indicate the 12 available storage locations. The unit is capable of storage of 12 complete 16 digit numbers in IC4. Normal dialing is accomplished upn a momentary depression of the start or originate inputs (TELEX-TWX, respectively) via diode 28 or direct to the $\overline{\text{HS}}$ input through line 26. Normal dialing does not affect the 12 number storage of IC4. Resistor 33 serves as a pull up resistor to the voltage of $V_{CC}$. Once the start or originate is initiated by the terminal, dialing and the $\overline{\text{mute}}$ signals are gated and buffered via IC2 as has been discussed with respect to circuit 10. The $\overline{\text{mute}}$ and $\overline{\text{DP}}$ outputs of IC3 are buffered by IC2 to drive the relays 16 and 20, respectively.

Once a number is dialed it is retained in the internal memory of IC3. In order to store the number permanently, the external store pushbutton 96 connected to lines 70 and 72 is depressed followed by the particular location desired. This can be repeated for 12 different numbers at the locations 1 through 0, *, #. When the unit is fully programmed to desired quantity of numbers, normal dialing can be accomplished and will not affect the storage as long as the storage button is not depressed. Any combination with pauses (depression of # symbol key during normal dialing) can be programmed. Once programmed, the numbers and storage locations should be tabulated for future use. To provide automatic calling of any one of the programmed numbers, the start or originate key on the terminal is depressed and the * key on the 12 button keypad is depressed followed by depression of the desired storage location of the number to be outputted by the unit.

Figure 3:
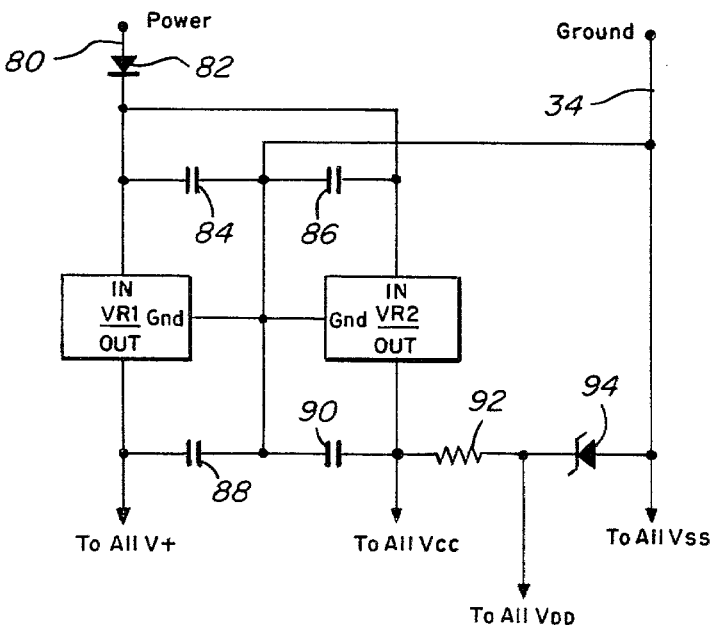
FIG. 3 is an alternate circuit for establishing the necessary voltage levels for the dialing system.

FIG. 3 shows an alternative power supply for either the circuit 10 or circuit 64. In FIG. 3, it can be seen a power line 80 is connected to the power line of any teleprinter. Ground line 34 is connected to the ground of the teleprinter. The positive voltage on line 80 should be between 14.5 and 20 volts and is supplied to diode 82 which provides negative voltage isolation and input to voltage regulators VR1 and VR2 which are Signetics μA78L12AC and μA78L05AC, respectively. VR1 provides 12 volts output regulation and VR2 provides 5 volt output regulation. Capacitors 84 and 86 provide input filtering for the associated regulators VR1 and VR2 respectively. Capacitors 88 and 90 provide output filtering for the associated regulators. VR1 provides V+ and VR2 provides $V_{CC}$. A resistor 92 provides current regulation to a zener diode 94 which can be used to regulate a 3.3 volt supply required for operation of IC1.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a conventional teleprinter terminal provided with a 12 button keypad including numerals 0 through 9, * and # symbols; and having a start button; a relatively high voltage power supply; a ground line; a mute circuit; and a dial circuit, the improvement comprising: a solid state dialing system operated by the keypad including integrated circuit means for receiving inputs from said 12 button keypad, storing the inputs and outputting pulses in response to the stored inputs; command signal input means connected to said integrated circuit means from said start button for initiating operation thereof in response to a command signal; and bias voltage means connected to said high voltage power supply and said ground line for producing a plurality of discrete relatively lower voltage levels to power said integrated circuit means and the command signal input means.

2. The invention as defined in claim 1 and further including buffer circuit means for receiving said outputted pulses from said integrated circuit means; relay means connected in said dial circuit and operatively connected to said buffer means for producing pulses in said dial circuit in response to said outputted pulses.

3. The invention as defined in claim 2 wherein said buffer means further includes an input from said command signal input means and inhibit means for inhibiting operation of said relay in response to the command signal being received from said command signal input means.

4. The invention as defined in claim 1 wherein said integrated circuit means further includes a mute signal output line for producing a mute signal coterminously with said outputted pulses, said mute signal being outputted to activate the mute circuit of said teleprinter.

5. The invention as defined in claim 4 and further including inhibit circuit means connected to said command signal input means for inhibiting said mute signal upon reception of said command signal from said command signal input means.

6. The invention as defined in claim 5 wherein said inhibit circuit means also includes a buffer means for buffering said mute signal.

7. The invention as defined in claim 1 wherein said bias voltage means includes a plurality of zener diodes and a plurality of current limiting resistors, said resistors being connected in series with said power supply, said zener diodes being connected between said series connected resistors and said ground line.

8. The invention as defined in claim 1 wherein said bias voltage means includes a plurality of integrated circuit voltage regulators connected in parallel to said voltage power supply and including input filter means and output filter means for filtering the input and output of each of said integrated circuit voltage regulators.

9. The invention as defined in claim 1 including memory means connected to said integrated circuit means for storing a plurality of multi-digit numbers subject to recall upon command.

10. A dialing system for incorporation into an existing teleprinter having a power supply and start means for producing a command signal, the improvement comprising, in combination:
a keypad,
an integrated circuit dialer including a plurality of inputs connectible to the keypad for receiving a multi-digit number to be dialed, said integrated circuit dialer including output means for outputting pulses in response to said inputs received from said keypad, and a start signal input receiving the command signal from said teleprinter;
bias voltage means connected to the power supply of said teleprinter and including a plurality of voltage regulator means for producing a plurality of reduced regulated voltages to be supplied to said integrated circuit; and
inhibit and buffer means connected to the output of said integrated circuit for buffering said output and inhibiting said output upon receipt of said command signal from said teleprinter.

11. The invention as defined in claim 10 including memory storage means connected to said integrated circuit dialer for storing a plurality of multi-digit numbers.

12. The invention as defined in claim 10 wherein said inhibit and buffer means includes a connection to said start signal input.

13. The invention as defined in claim 12 wherein said voltage regulator means includes a positive input line and a ground line for connection to the power supply of said teleprinter, each of said voltage regulator means including a zener diode connected between said positive input line and said ground line.

14. The invention as defined in claim 13 wherein said voltage regulator means further includes a plurality of current limiting resistors connected between said zener diodes.

15. In combination with an existing teleprinter unit having an internal power supply for energization thereof under a relatively high operating voltage, an operational start key and a dialing circuit adapted to be operated by a mechanical dialing mechanism; a keypad replacing said dialing mechanism and a solid state pulse dialer connected to the keypad for controlling the dialing circuit, said pulse dialer having input terminals connected to the keypad, output terminals, an operating power terminal to which power is applied at a voltage level lower than the high operating voltage of the teleprinter unit and a command terminal to which a command signal is applied; the improvement residing in means for interfacing the pulse dialer with the teleprinter unit, comprising means connecting the start key between the power operating terminal and the command terminal for generating said command signal, functional relay means energized at an intermediate voltage level between the high operating voltage and said lower voltage level for operating the dialing circuit, driver means connecting the output terminals of the pulse dialer to the relay means for controlling said operation of the dialing circuit, and voltage regulating means connecting the internal power supply of the teleprinter unit to the power operating terminal of the pulse dialer and the relay means for energization thereof at said lower and intermediate voltage levels, respectively.

* * * * *